(12) United States Patent
Suzuki et al.

(10) Patent No.: US 8,699,166 B2
(45) Date of Patent: Apr. 15, 2014

(54) MAGNETIC HEAD DRIVE DEVICE WITH MICRO-ACTUATORS OF END ARMS ROTATING IN A DIRECTION OPPOSITE MICRO-ACTUATORS OF INTERMEDIATE ARMS

(75) Inventors: Kenji Suzuki, Kanagawa (JP); Shinsuke Nakagawa, Ibaraki (JP); Toshihiko Shimizu, Ibaraki (JP); Eiji Soga, Kanagawa (JP); Takaaki Deguchi, Kanagawa (JP); Mutsuro Ohta, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 672 days.

(21) Appl. No.: 12/963,111

(22) Filed: Dec. 8, 2010

(65) Prior Publication Data

US 2011/0141614 A1 Jun. 16, 2011

(30) Foreign Application Priority Data

Dec. 11, 2009 (JP) ................................ 2009-281627

(51) Int. Cl.
*G11B 5/596* (2006.01)

(52) U.S. Cl.
USPC ........................ 360/55; 360/77.04; 360/78.05

(58) Field of Classification Search
None
See application file for complete search history.

(56) References Cited

U.S. PATENT DOCUMENTS

| | | | |
|---|---|---|---|
| 6,542,326 B1 * | 4/2003 | Ell et al. ..................... | 360/78.05 |
| 6,600,619 B1 * | 7/2003 | Morris et al. ............... | 360/78.05 |
| 6,621,653 B1 * | 9/2003 | Schirle ....................... | 360/78.12 |
| 6,624,982 B2 * | 9/2003 | Masuda et al. ............. | 360/78.12 |
| 6,697,211 B2 | 2/2004 | Koganezawa | |
| 6,765,743 B2 * | 7/2004 | Goodman et al. ......... | 360/78.05 |
| 6,922,305 B2 * | 7/2005 | Price .......................... | 360/78.12 |
| 6,972,924 B1 * | 12/2005 | Chen et al. ................. | 360/78.05 |
| 7,027,253 B1 * | 4/2006 | Sun et al. ......................... | 360/75 |

FOREIGN PATENT DOCUMENTS

| | | |
|---|---|---|
| JP | 2000260140 | 9/2000 |
| JP | 2002074872 | 3/2002 |

* cited by examiner

Primary Examiner — Wayne Young
Assistant Examiner — James L Habermehl (57) ABSTRACT

A magnetic head drive device including a suspension for supporting a magnetic head, and a main actuator that produces rotary movement of the magnetic head by applying current to a coil. The main actuator includes end arms each comprising a single micro-actuator, and an intermediate arm comprising two micro-actuators. The micro-actuators of the end arms are driven in the same direction, and the micro-actuators of the intermediate arm are driven in the opposite direction to the drive direction of the micro-actuators of said the arms.

7 Claims, 9 Drawing Sheets

Prior Art

MAGNETIC HEAD DRIVE DEVICE WITH MICRO-ACTUATORS OF END ARMS ROTATING IN A DIRECTION OPPOSITE MICRO-ACTUATORS OF INTERMEDIATE ARMS

CROSS REFERENCE TO RELATED APPLICATION

This application claims priority from the Japanese Patent Application No. 2009-281627, filed Dec. 11, 2009, the disclosure of which is incorporated herein in its entirety by reference.

BACKGROUND

Arm vibrations can negatively affect the performance of a hard disk drive (HDD). Even if arm vibrations are reduced, it is still difficult to completely suppress the arm vibrations.

BRIEF DESCRIPTION OF THE DRAWINGS

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

In various embodiments, in a magnetic head drive device, a phase loss of the controller is reduced and high positional location accuracy is achieved. Moreover, stability of the control system is guaranteed, by reducing the number of excited arm modes to a single mode and by ensuring that the frequency responses of the excited arm modes of all of the heads are in phase.

In one embodiment, a magnetic head drive device includes: a suspension that supports a magnetic head that performs recording/reproduction of information on a magnetic disk surface; a micro-actuator that produces minute movement of the suspension; and a main actuator that produces rotary movement of the magnetic head by applying current to a coil that is installed at the end of the actuator, and that supports the micro-actuator. The main actuator includes both-end arms having a single micro-actuator at both ends of the main actuator, and an intermediate arm having two micro-actuators. The intermediate arm(s) is in an intermediate section of the main actuator. The micro-actuators of the end arms are driven in the same direction and the micro-actuator of the intermediate arm is driven in the opposite direction to the drive direction of both of the micro-actuators of the end arms.

In another embodiment, the main actuator includes a plurality of intermediate arms and a plurality of end arms.

In a further embodiment, an arm comprising the main actuator comprises two intermediate arms and two end arms.

In another embodiment, the main actuator includes a single intermediate arm and two end arms.

In one embodiment, a micro-actuator is driven by a piezoelectric element.

In another embodiment, a control circuit drives the micro-actuator, wherein the control circuit performs gain stabilization control using a notch filter.

In a further embodiment, a control circuit drives the micro-actuator, wherein the control circuit performs phase stabilization control of the excited arm mode.

In one embodiment, a hard disk drive (HDD) uses the magnetic head drive device.

In various embodiments, a phase loss produced by the notch filter that is provided for dealing with arm modes and that presents an obstacle to improvement of the control bandwidth of a magnetic head drive device provided with a micro-actuator can be reduced and whereby high-precision positional location of the magnetic head can be achieved.

Figure 9:
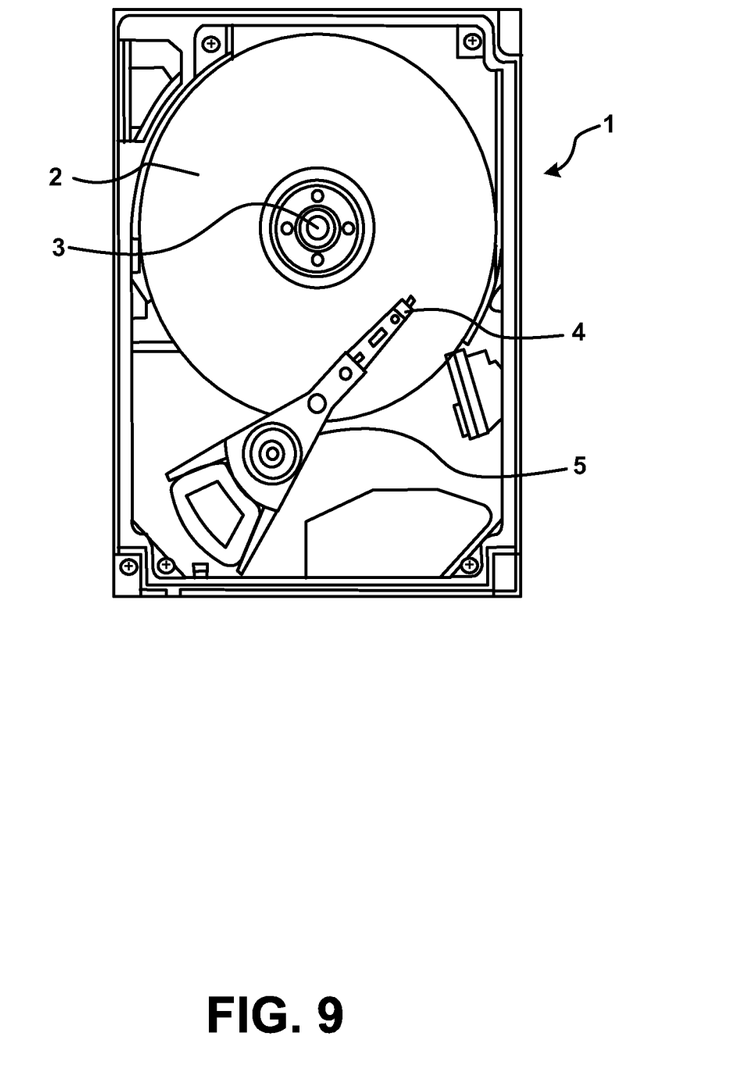
FIG. 9 illustrates an example of a magnetic disk device, in accordance with an embodiment of the present invention.

FIG. 9 is a view showing the overall layout of a magnetic disk device 1. The magnetic disk device 1 comprises: a magnetic disk 2 on which is recorded magnetic information; a spindle motor 3 that rotates the magnetic disk 2; and a magnetic head 4 that reads/writes magnetic information while levitating slightly with respect to the surface of the magnetic disk 2; and an actuator 5 that is equipped with the magnetic head 4 at its tip. Also, a printed circuit board that performs control of the spindle motor 3 and/or actuator 5 is mounted (e.g., by a screw) on the face opposite the spindle motor 3 or actuator 5, with respect to the casing in which the spindle motor 3 and actuator 5 are accommodated.

When the magnetic disk device 1 is started up, the magnetic head 4 at the tip of the actuator 5 is slightly levitated over the surface of the magnetic disk 2 by rotating the spindle motor 3 that supports the magnetic disk 2, so that this magnetic head 4 moves in the target radial direction of the magnetic disk 2 and reading/writing of information is performed while positional location of the magnetic head 4 is effected onto the prescribed track on the surface of the magnetic disk 2.

Figure 2:
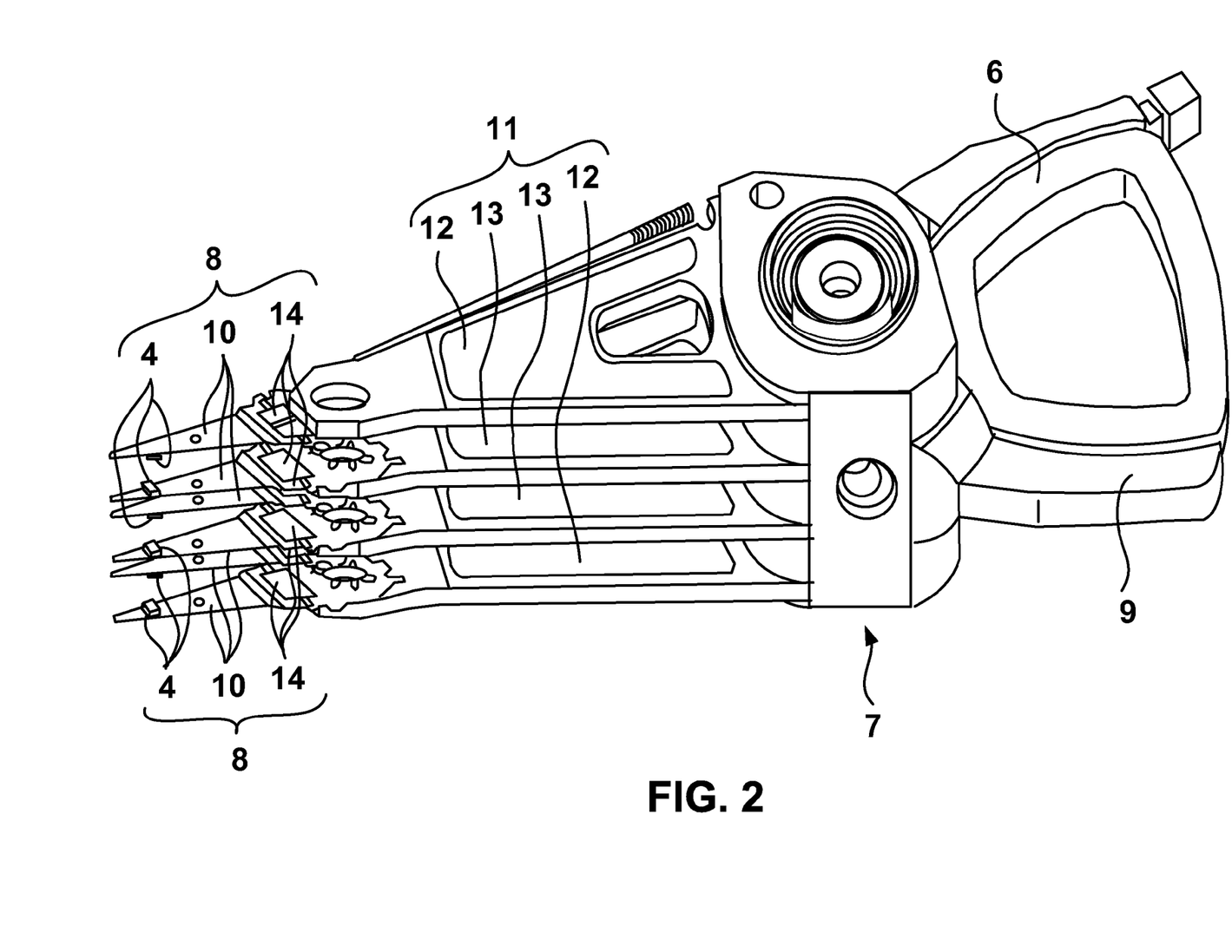

FIG. 2 shows a diagram of the actuator. The actuator 5 that performs positional location of the magnetic head 4 has two head positional locating mechanisms: the first of these is a positional locating mechanism using a main actuator 7 that rotates the magnetic head 4 by applying current to the coil 6 of the voice coil motor, in order to obtain a prescribed rotary moment. A further positional locating mechanism uses a plurality of micro-actuators 8.

Main actuator 7 comprises the coil 6 of the rotary section of the voice coil motor, a coil holder 9 that holds the coil 6, and arms 11 that support micro-actuators 8 at their tips. Also, of the plurality of arms 11, a single micro-actuator 8 is connected at the tips of the two upper and lower end arms 12 and two, upper and lower, micro-actuators 8 are connected at the tip of these intermediate arms 13 that are arranged between these upper and lower end arms 12. The numbers of the magnetic heads 4 at the tips of the micro-actuators 8 are sequentially defined, from the bottom, as head number 0, head number 1, head number 2. In the case of an actuator with six heads, the head numbers run up to and including 5.

Figure 3:
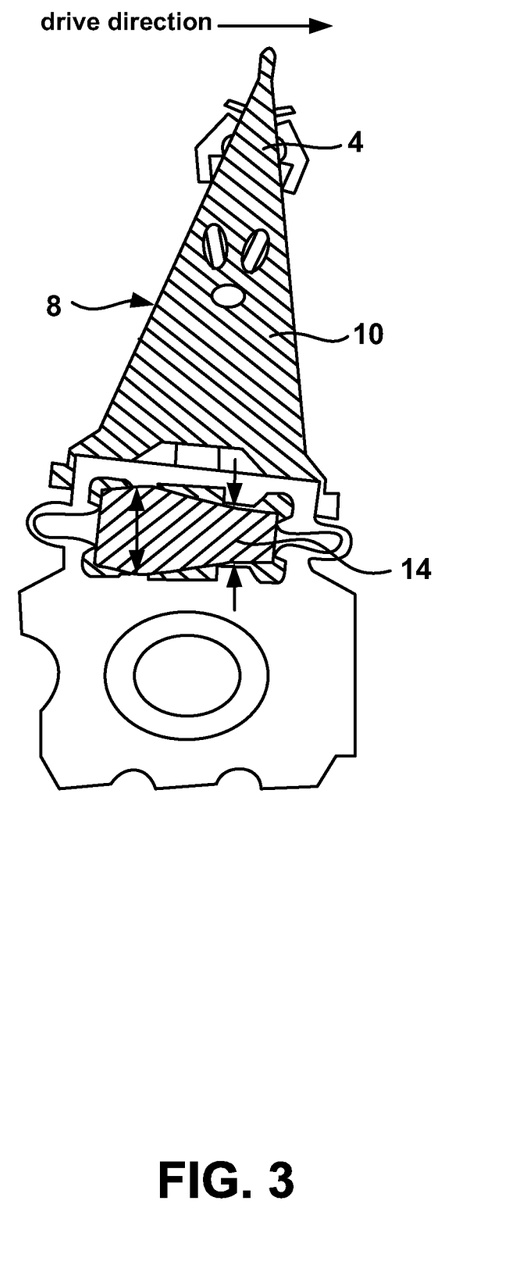

As shown in FIG. 3, in the micro-actuators 8, the magnetic head 4 at the tip of a suspension 10 is moved by deformation of a piezoelectric element 14 that is produced when different voltages are applied to left and right piezoelectric elements 14 at the tip of the arm 11 of the main actuator 7. Since, in order to positionally locate a prescribed magnetic head 4, voltage is applied to all of the piezoelectric elements 14, the magnetic heads 4 in respect of which positional location is not performed are also subjected to swinging movement. The positionally located head is therefore subject to the effect of vibration of the arm 11 due to deformation of the piezoelectric elements 14 of the heads other than the head that is being positionally located, and the drive reactions of the piezoelectric elements 14. In contrast, in conventional technology, the drive reaction of the piezoelectric elements is reduced by arranging for the drive directions of the heads of odd number and even number to be opposite.

Figure 4:
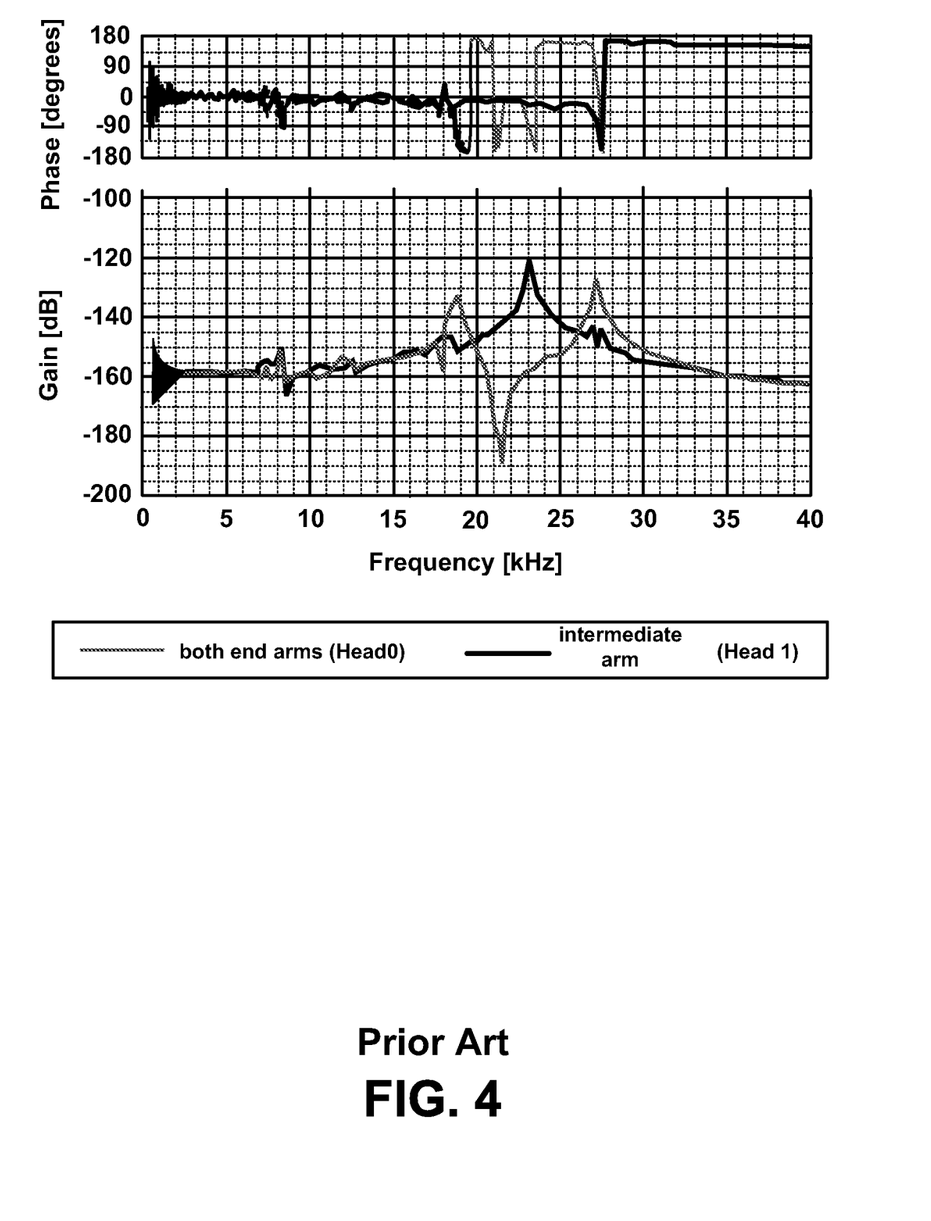
FIG. 4 illustrates an example of a comparison of the frequency responses of intermediate arms and both-end arms according to prior art.
Figure 5:
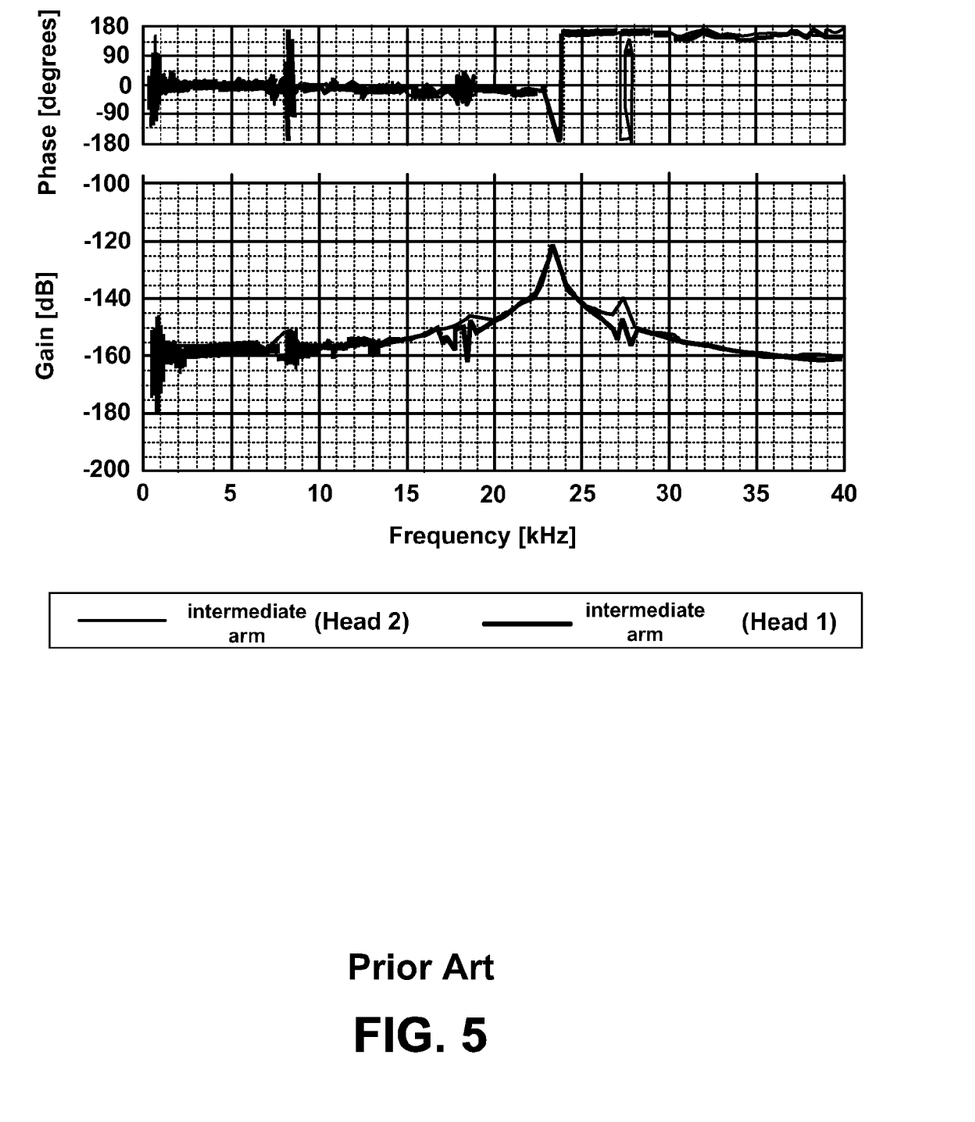
FIG. 5 illustrates an example of a comparison of the frequency responses of intermediate arms according to prior art.

The convention technology is further described with respect to FIG. 4 and FIG. 5, that show the frequency response produced by piezoelectric element drive of an actuator. FIG. 4 is a graph showing a comparison of the head frequency response of the arms at both ends (head number 0) and an intermediate arm 13 (head number 1) in a six-head actuator.

Also, FIG. 5 is a graph showing a comparison of the head frequency response of two intermediate arms 13 (head numbers 1, 2). The mode seen at 7.5 kHz in FIG. 4 is a mode called the "tilt mode", in which the gain rises from the baseline. In the tilt mode, the phases of the arms at both ends and the intermediate arms are opposite, so the gain rises from the baseline over a wide range. Consequently, the frequency width of the corresponding notch filter is also large. The mode of small gain seen at 8.5 kHz is a mode called the "arm mode": this mode is excited by the drive reaction produced by driving the piezoelectric elements 14. In FIG. 4, the phases of the arm modes are in phase, so the frequency range of the notch filter can be small. However, in the case of the frequency response of the intermediate arms in FIG. 5, the arm modes are in anti-phase.

At 22 kHz, a mode is present termed the "suspension mode", in which the suspension 10 undergoes considerable deformation. It can be seen from FIG. 4 that the frequency response produced by the piezoelectric element drives differs considerably between the arms at both ends and the intermediate arms. This is because, whereas, in the case of the piezoelectric elements of the intermediate arms, the upper and lower piezoelectric elements are driven in opposite directions, so the drive reactions cancel out. In the case of the piezoelectric elements of the arms at both ends, the drive reactions cannot cancel each other out. In other words, in the conventional technology, there are two problems. First, in the vicinity of 8 kHz, a plurality of arm modes are present, including a tilt mode. Second, in the vicinity of 20 kHz, the frequency characteristic of the suspension mode is different between the arms at both ends and the intermediate arms. Moreover, the phase loss can be reduced by providing dummy actuators on the arms at both ends, so that, with regard to the mode of the suspension in the vicinity of 20 kHz, the frequency response is the same in the arms at both ends and intermediate arms 13. In contrast, regarding the arm modes in the vicinity of 8 kHz, a plurality of modes including a twisting mode or tilt mode of vibration outside the plane are excited, so it is necessary to employ a notch filter of large frequency width and phase loss is generated.

Accordingly, in various embodiments of the present invention the number of excited modes is reduced to a single mode (or reducing the number of excited modes). Furthermore, in order to reduce the frequency width that is covered by the notch filter employed, it is ensured that the frequency response is in-phase for all of the heads in the excited arm modes.

Figure 1:
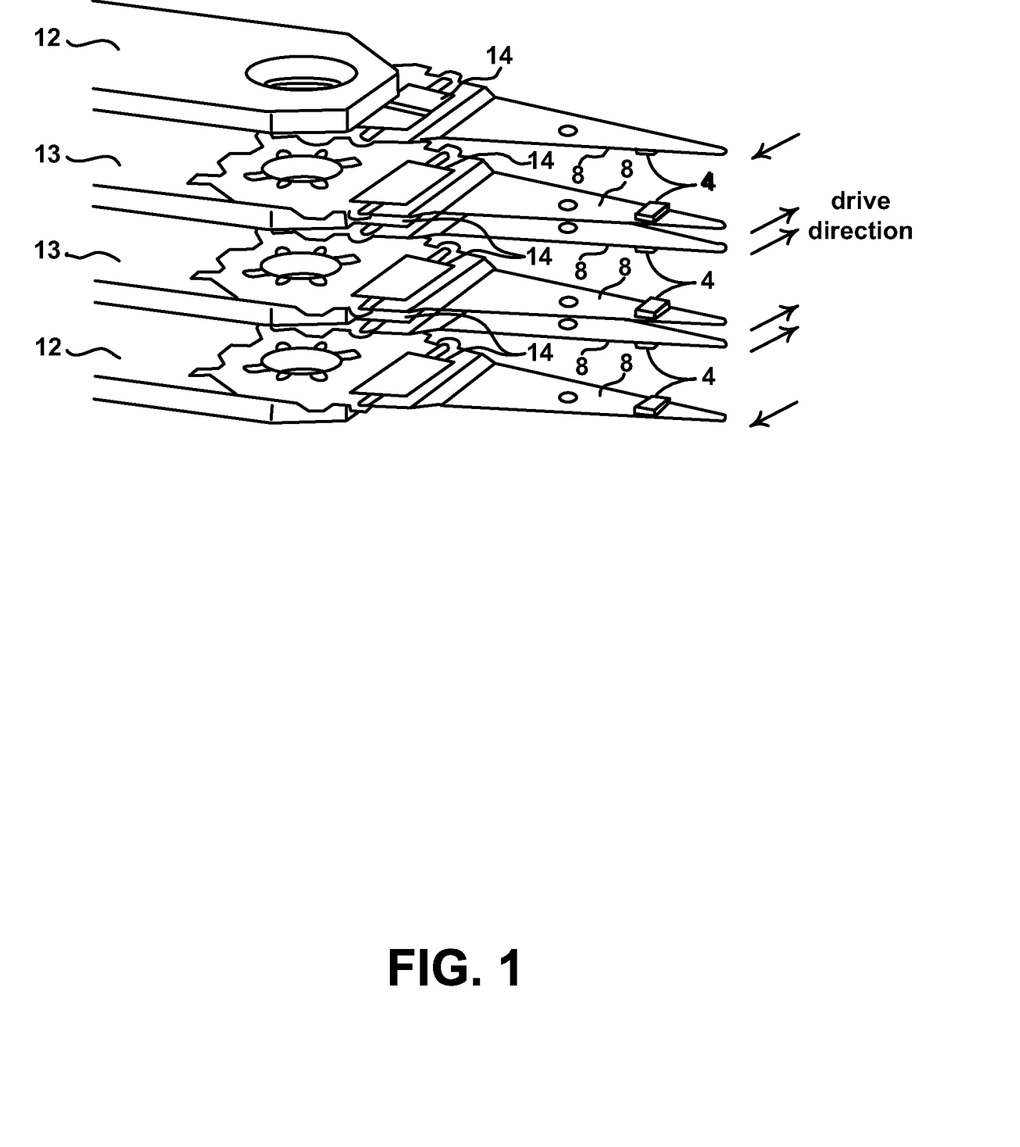
FIGS. 1-3 illustrate examples of an actuator, in accordance with embodiments of the present invention.

In one embodiment, the number of magnetic disks 2 is three and in which an actuator 5 has six magnetic heads 4. Since the number of magnetic heads 4 is six, there are two respective intermediate arms 13 between the arms 12 at both ends in each case. In this embodiment, taking the drive directions of the piezoelectric elements 14 of the arms 12 at both ends as being in the same direction, the drive directions of the piezoelectric elements 14 of the two intermediate arms 13 are specified as being in the opposite direction to that of the arms 12 at both ends. The drive directions are shown in FIG. 1. The drive direction of a piezoelectric element 14 can be specified by changing the upper and lower surfaces of the piezoelectric element 14. Also, the drive direction of the piezoelectric element 14 can be changed over using the preamplifier by providing a control circuit.

Figure 6:
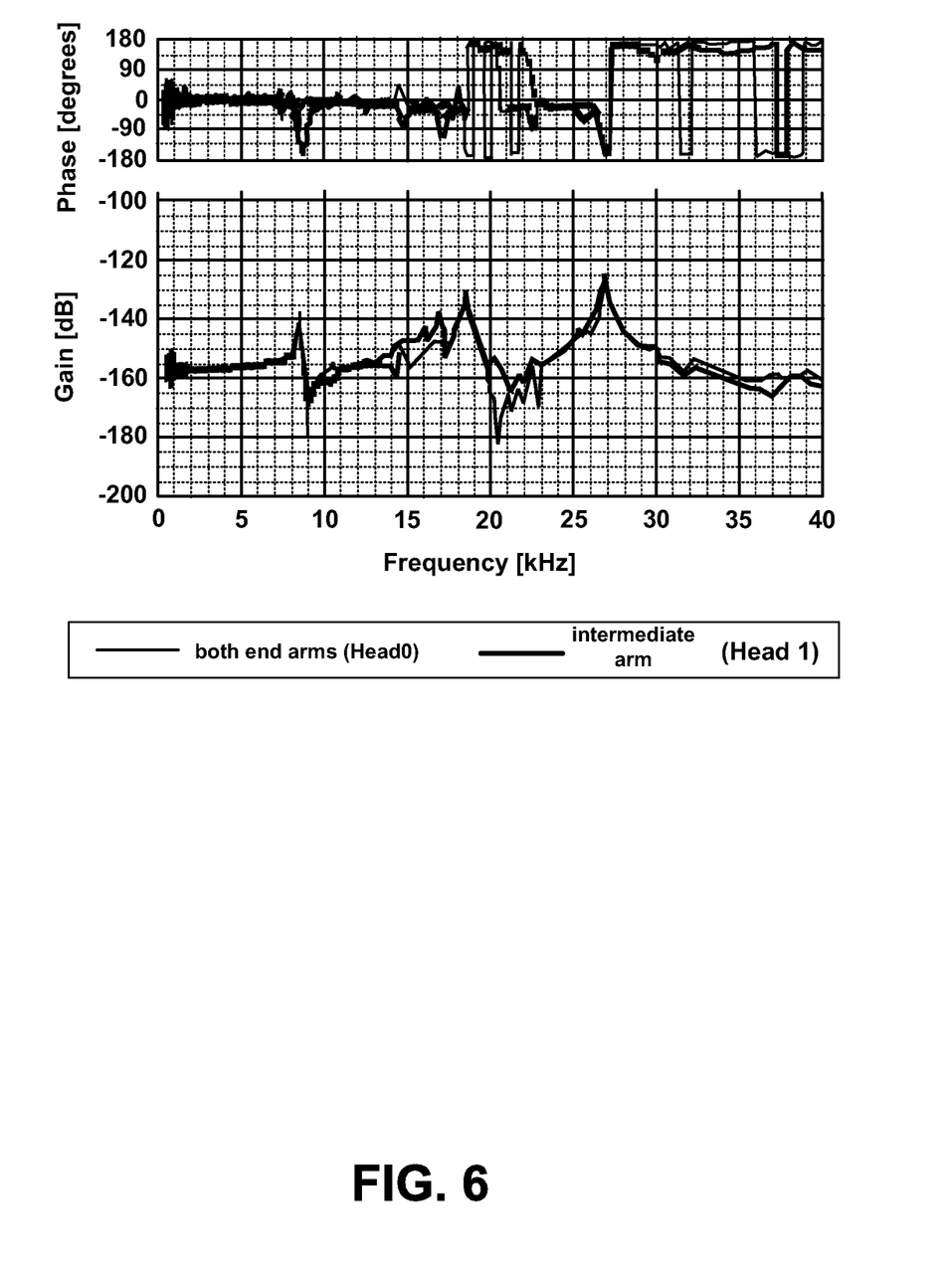
FIG. 6 illustrates examples of frequency responses, in accordance with an embodiment of the present invention.

In the frequency response of the magnetic head 4 produced by drive of the upper and lower piezoelectric elements 14 of the intermediate arms 13, to ensure that the excited vibration modes of the arms are in phase, the upper and lower piezoelectric elements 14 of the intermediate arms 13 are driven in the same direction. Furthermore, the arm mode is a mode in which balance is achieved by the arms 11 or actuator 5. The arm mode in which the intermediate arms 13 move in anti-phase is a mode in which balance is achieved by the intermediate arms 13, so little excitation of the both-end arms 12 takes place. The same applies in the case of the arm mode in which the arms 12 at both ends move in anti-phase. Consequently, by driving the two intermediate arms 13 and the arms 12 at both ends respectively in the same directions and driving the piezoelectric elements 14 of the intermediate arms 13 and the arms 12 at both ends in opposite directions, in-phase excitation of a single mode is achieved, and the frequency width of the notch filter can thus be made small. The frequency response according to this embodiment is shown in FIG. 6. Also, the two piezoelectric elements of the intermediate arms 13 are driven in phase, so the frequency characteristic in the 20 kHz suspension mode does not differ much between the arms 12 at both ends and the intermediate arms 13: the width of the corresponding notch filter can therefore be made small.

The phase lag produced by the notch filter can be reduced by reducing the number of excited modes to a single mode, and ensuring that all of the heads of the excited mode are in phase. In one embodiment, there is only a single excited arm mode and all of the heads are in phase, so gain stabilization control using a notch filter can be employed as the method of control. This control is performed by a control circuit.

In another embodiment, a control system is available apart from gain stabilization control.

In the gain stabilization control employing a notch filter, phase loss can be reduced by decreasing the frequency width employed for the notch filter. In another embodiment, a control system in which phase stabilization is applied to the excited arm mode. Regarding the drive system of the piezoelectric elements, the two intermediate arms 13 and the arms 12 at both ends are respectively driven in the same direction, and the piezoelectric elements 14 of the intermediate arms 13 and the arms 12 at both ends are driven in the opposite direction.

The characteristic features of phase stabilization control are that, if the excited modes are in phase, it is possible to achieve control irrespective of the gain of the excited arm mode and, furthermore that vibration produced by errors in positional location at the frequency of the mode in which phase stabilization control is performed can be forcibly suppressed. The control bandwidth can be improved by mounting a micro-actuator 8, so low-band torque noise and/or external disturbance of the low-frequency region, such as disk flutter can be suppressed, but vibration produced by errors in positional location i.e. flutter produced by arm vibration at frequencies above the control band cannot be suppressed. However, with the phase stabilization, suppression can be achieved of vibration produced by errors in positional location due to arm flutter, which represents the main type of vibration produced by errors in positional location of a magnetic disk device with a micro-actuator 8 installed. Hence further improvement in the precision of positional location can be obtained according to the present invention.

Figure 7:
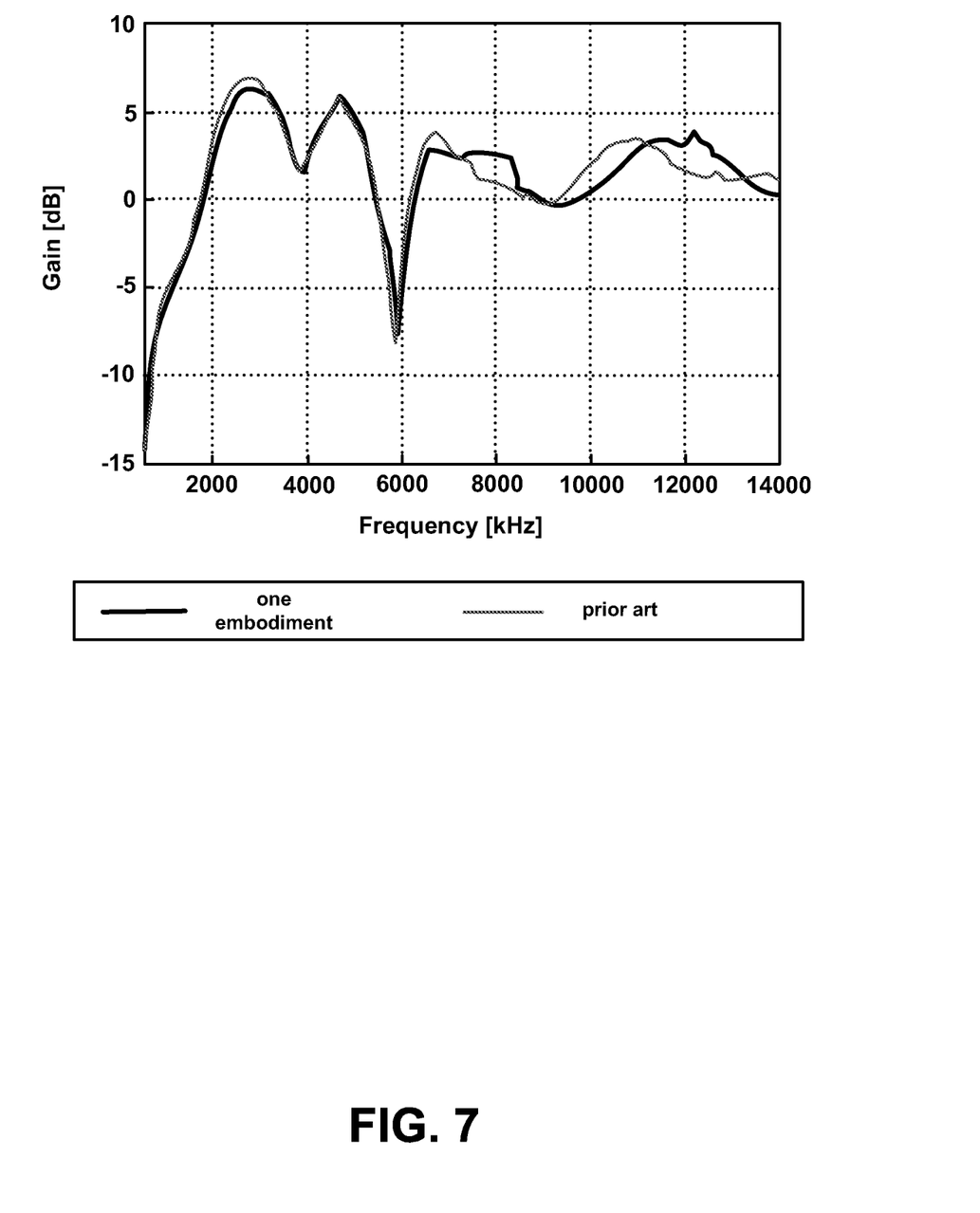
FIGS. 7-8 illustrate examples of a sensitivity function, in accordance with embodiments of the present invention.
Figure 8:
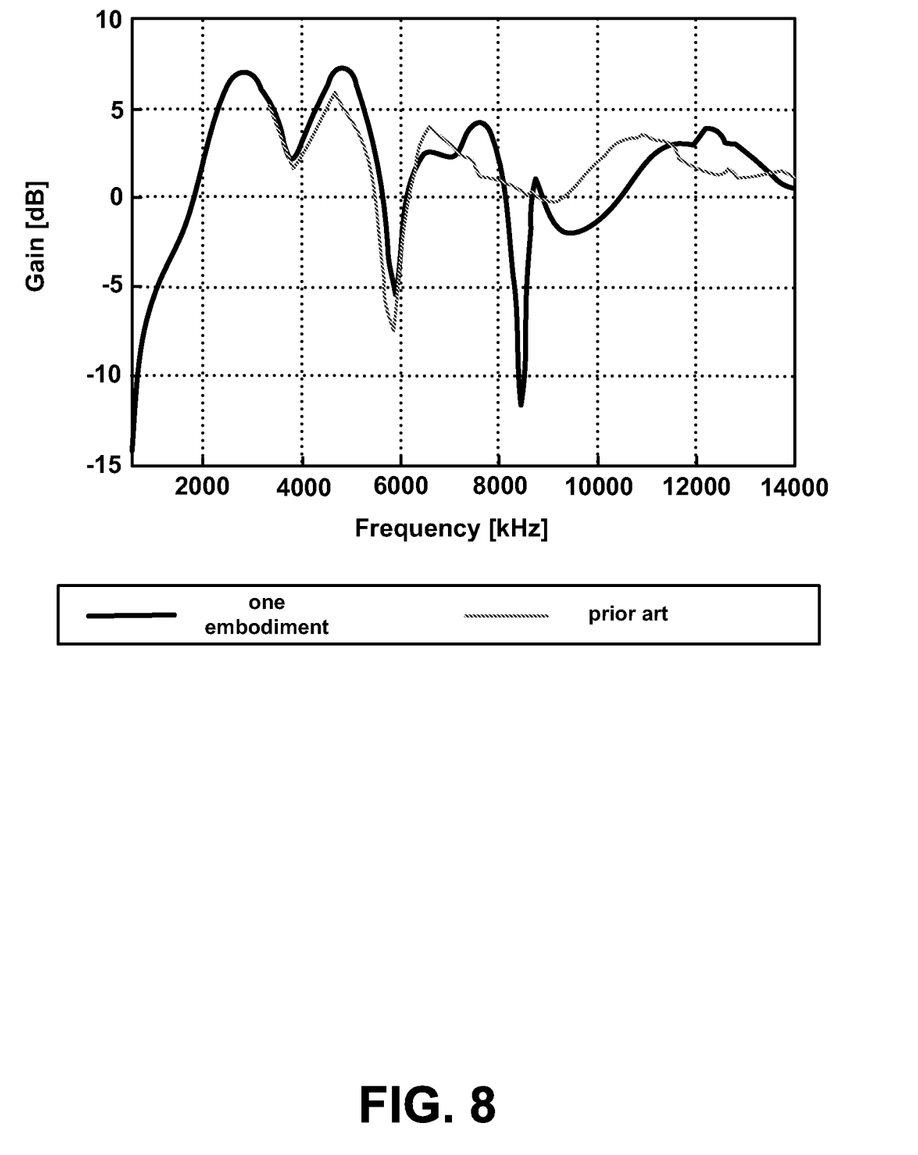

FIG. 7 shows a comparison of the sensitivity function obtained with the first embodiment and the sensitivity function of the prior art. FIG. 8 shows a comparison of the sensitivity function obtained with the second embodiment and the sensitivity function of the prior art. It can be seen from FIG. 7 that, in one embodiment, as seen in particular in the vicinity of 2300 Hz, by reducing the phase loss, the gain of the sensitivity function is lowered in the lower frequency band, so stable control can be achieved. Also, another embodiment, as seen in the vicinity of 8500 Hz in FIG. 8, the sensitivity function is no more than 0 dB at the frequency of the arm mode, so it can be seen that arm flutter can be suppressed.

In various embodiments, a six-head actuator 5 is utilized, an actuator 5 having four magnetic heads 4 at the upper and lower surfaces of two magnetic disks 2 is utilized. Also, if the phase of the arm modes of all of the heads is the same, the a six-headed actuator or an actuator having for magnetic heads are utilized even when the adjacent arm modes are more than one.

Various embodiments of the present invention are thus described. While the present invention has been described in particular embodiments, it should be appreciated that the present invention should not be construed as limited by such embodiments, but rather construed according to the following claims.

The invention claimed is:

1. A magnetic head drive device comprising:
   a suspension for supporting a magnetic head; and
   a main actuator that produces rotary movement of said magnetic head by applying current to a coil; wherein said main actuator comprises:
      end arms each comprising a single micro-actuator; and
      an intermediate arm comprising two micro-actuators;
   wherein said micro-actuators of said end arms are driven in the same direction, and said micro-actuators of said intermediate arm are driven in the opposite direction to said drive direction of said micro-actuators of said end arms.

2. The magnetic head drive device as claimed in claim 1, further comprising:
   a plurality of intermediate arms.

3. The magnetic head drive device as claimed in claim 1, further comprising:
   two intermediate arms and two of said end arms.

4. The magnetic head drive device as claimed in claim 1, further comprising:
   a single intermediate arm and two of said end arms.

5. The magnetic head drive device as claimed in claim 1, further comprising:
   a piezoelectric element for driving said micro-actuators.

6. The magnetic head drive device as claimed in claim 1, further comprising:
   a control circuit that drives said micro-actuators, wherein said control circuit performs gain stabilization control using a notch filter.

7. The magnetic head drive device as claimed in claim 1, further comprising:
   a control circuit that drives said micro-actuators, wherein said control circuit performs phase stabilization control of an excited arm mode.

* * * * *